(12) United States Patent
Park et al.

(10) Patent No.: US 9,110,212 B2
(45) Date of Patent: Aug. 18, 2015

(54) LIGHT SOURCE MODULE AND LIGHT SOURCE ASSEMBLY HAVING THE SAME

(71) Applicant: SAMSUNG DISPLAY CO., LTD., Yongin, Gyeonggi-Do (KR)

(72) Inventors: Chan-Jae Park, Busan (KR); Seung-Hwan Baek, Seoul (KR); Youn-Ho Han, Yongin-si (KR); Seok-Hyun Nam, Seoul (KR); Sang-Won Lee, Seongnam-si (KR); Young-Keun Lee, Cheonan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 231 days.

(21) Appl. No.: 13/680,029

(22) Filed: Nov. 17, 2012

(65) Prior Publication Data

US 2014/0016351 A1  Jan. 16, 2014

(30) Foreign Application Priority Data

Jul. 10, 2012  (KR) ........................ 10-2012-0075056

(51) Int. Cl.
| | |
|---|---|
| *G02B 6/00* | (2006.01) |
| *F21V 8/00* | (2006.01) |
| *F21V 9/00* | (2015.01) |
| *F21V 13/08* | (2006.01) |
| *F21V 9/16* | (2006.01) |
| *F21V 13/14* | (2006.01) |
| *B82Y 20/00* | (2011.01) |

(52) U.S. Cl.
CPC ................ *G02B 6/0066* (2013.01); *F21V 9/00* (2013.01); *F21V 9/16* (2013.01); *F21V 13/08* (2013.01); *F21V 13/14* (2013.01); *G02B 6/0005* (2013.01); *G02B 6/0021* (2013.01); *G02B 6/0023* (2013.01); *G02B 6/0028* (2013.01); *G02B 6/0068* (2013.01); *B82Y 20/00* (2013.01); *G02B 6/0013* (2013.01); *Y10S 977/774* (2013.01); *Y10S 977/95* (2013.01)

(58) Field of Classification Search
CPC .. G02B 6/0021; G02B 6/0013; G02B 6/0023; G02B 6/0006; G02B 6/0005; G02F 1/133617; G02F 1/133615
USPC ......... 362/581, 293, 621, 622, 559, 561, 555, 362/610, 612, 611
See application file for complete search history.

(56) References Cited

U.S. PATENT DOCUMENTS

| | | | | |
|---|---|---|---|---|
| 6,669,350 | B2 * | 12/2003 | Yamashita et al. | 362/612 |
| 6,913,366 | B2 * | 7/2005 | Lee | 362/628 |
| 7,157,853 | B2 * | 1/2007 | Imai et al. | 313/512 |
| 7,360,937 | B2 * | 4/2008 | Han et al. | 362/608 |
| 2006/0262554 | A1 * | 11/2006 | Mok et al. | 362/555 |
| 2009/0122514 | A1 * | 5/2009 | Yoon et al. | 362/84 |
| 2010/0195022 | A1 * | 8/2010 | Shikii et al. | 349/65 |
| 2011/0149592 | A1 * | 6/2011 | Artsyukhovich et al. | 362/555 |

FOREIGN PATENT DOCUMENTS

| | | |
|---|---|---|
| JP | 2007305534 A | 11/2007 |
| JP | 4452528 B2 | 2/2010 |
| KR | 1020110111122 A | 10/2011 |

* cited by examiner

*Primary Examiner* — Julie Bannan
(74) *Attorney, Agent, or Firm* — Cantor Colburn LLP

(57) ABSTRACT

A light source module includes a light source unit which generates a light; a light emitting part spaced apart from the light source unit and comprising a light emitting surface; and a light transmitting part which transmits the light generated by the light source unit to the light emitting part. The light emitting part emits the light transmitted by the light transmitting part, through the light emitting surface.

19 Claims, 5 Drawing Sheets

LIGHT SOURCE MODULE AND LIGHT SOURCE ASSEMBLY HAVING THE SAME

This application claims priority to Korean Patent Application No. 10-2012-0075056, filed on Jul. 10, 2012, and all the benefits accruing therefrom under 35 U.S.C. §119, the contents of which in its entirety is herein incorporated by reference.

BACKGROUND

1. Field

Exemplary embodiments of the invention relate to a light source module, and a light source assembly having the light source module. More particularly, exemplary embodiments of the invention relate to a light source module used for a display apparatus, and a light source assembly having the light source module.

2. Description of the Related Art

A display apparatus includes a display panel displaying an image, and a light source assembly providing a light to the display panel. An edge-illumination type light source assembly in which a light source unit is disposed at an edge of a light guide plate is normally used for the display apparatus, to decrease a thickness of the display apparatus.

Further, as light-efficiency of a light source increases, a corner-illumination type light source assembly in which the light source unit is disposed at a corner of the light guide plate has been used for the display apparatus, to decrease an area which the light source unit occupies.

However, where the number of the light sources decreases and the light source unit is disposed at the edge or the corner of the light guide plate, a heat generated from the light source unit is focused on a specific portion, such that it is desirable to dissipate the heat more efficiently. In addition, a hot spot may occur more easily at the specific portion in which the light source unit is disposed. Thus, a specific structure is desired to enhance heat dissipation, so that a bezel of the display apparatus may be decreased.

Further, even though the light source unit is merely disposed at the edge or the corner of the light guide plate, an additional space for the light source unit and for a driving unit for the light source unit is necessary, such that it may be difficult to reduce a size of the bezel.

SUMMARY

One or more exemplary embodiment of the invention provides a light source module without a specific dissipation structure and capable of decreasing a bezel-size of a display apparatus.

One or more exemplary embodiment of the invention also provides a light source assembly having the light source module.

An exemplary embodiment of a light source module according to the invention includes a light source unit, a light transmitting part and a light emitting part. The light source unit generates a light. The light transmitting part transmits the light generated by the light source unit. The light emitting part is spaced apart from the light source unit and includes a light emitting surface. The light emitting part emits the light transmitted by the light transmitting part, through the light emitting surface.

In an exemplary embodiment, the light emitting part may further include upper and lower reflective surfaces facing each other, and a rear reflective surface connecting the upper and lower reflective surfaces with each other and connected to the light transmitting part.

In an exemplary embodiment, the light emitting surface may have a curved shape, and each of the upper and lower reflective surfaces may have a half-circular plate shape.

In an exemplary embodiment, the light generated by the light source unit may be a blue light B.

In an exemplary embodiment, the upper and lower reflective surfaces, the rear reflective surface and the light emitting surface may form a receiving space. A light converting material converting the blue light B to a white light W, and an enclosing material fixing and enclosing the light converting material, may fill the receiving space.

In an exemplary embodiment, the light converting material may include a phosphor or a quantum dot, and the enclosing material may include a silicone.

In an exemplary embodiment, each of the light transmitting part and the light emitting part may be plural. The plural light transmitting parts may be respectively connected to the plural light emitting parts.

In an exemplary embodiment, the light generated by the light source unit may include a red light R, a green light G and a blue light B.

In an exemplary embodiment, the upper and lower reflective surfaces, the rear reflective surface and the light emitting surface may form a receiving space. An enclosing material may fill the receiving space. The red light R, the green light G and the blue light B may be mixed to be a white light W in the receiving space.

In an exemplary embodiment, the light transmitting part may transmit the red light R, the green light G and the blue light B to one light emitting part.

In an exemplary embodiment, the light generated by the light source unit may include a first light, a second light and a blue light B. A red light R and the blue light B may be mixed to be the first light, and a green light G and the blue light B may be mixed to be the second light.

In an exemplary embodiment, the upper and lower reflective surfaces, the rear reflective surface and the light emitting surface may form a receiving space. An enclosing material may fill the receiving space.

In an exemplary embodiment, the light transmitting part may transmit the first light, the second light and the blue light B to one light emitting part.

In an exemplary embodiment, the light transmitting part may be an optical fiber cable.

In an exemplary embodiment, the light source unit may include a light emitting diode ("LED") which emits the light, a first lens which advances the light in parallel, and a second lens which focuses the light to the light transmitting part.

In an exemplary embodiment of a light source assembly according to the invention, the light source assembly includes a light guide plate which guides a light, and a light source module providing the light to the light guide plate. The light source module includes a light source unit which generates the light, a light transmitting part which transmits the light generated by the light source unit, and a light emitting part spaced apart from the light source unit and including a light emitting surface, where the light emitting part emits the light transmitted from the light transmitting part, through the light emitting surface.

In an exemplary embodiment, the light guide plate may have first and second side surfaces which cross each other, and the light source module may be disposed at a corner portion of the light guide plate where the first and second side surfaces cross each other.

In an exemplary embodiment, the light emitting surface may have a curved shape, and the light guide plate may further include an incident surface into which the light from the light emitting surface is incident. The incident surface may be disposed between the first and second side surfaces and may have a curved shape.

In an exemplary embodiment, the light guide plate may have a light incident side surface, and a plurality of the light source modules may be disposed adjacent to the light incident side surface.

In an exemplary embodiment, the light incident side surface may include a plurality of incident surfaces with a concave curved shape. The light source modules may be respectively disposed adjacent to the incident surfaces.

According to one or more exemplary embodiment of the invention, the light source unit is spaced apart from the light emitting part, and thus an additional dissipation structure is unnecessary in the light source assembly. In addition, a decrease in display quality or durability due to heat generated from the light source unit is reduced or effectively prevented. Since the heat generated from the light source unit is not transmitted to the light guide plate, for example, a hot spot or bending of the light guide plate may be reduced or effectively prevented.

In addition, even though the light emitting part is disposed at the corner portion of the light guide plate, the light emitting surface of the light emitting part and the incident surface of the light guide plate both have curved shape, and thus the light incident into the light guide plate may have a wide light-advancing angle.

In addition, the incident surface of the light guide plate is concaved with the curved shape and the light emitting part is disposed at the concaved portion of the incident surface. Thus an area occupied by the light emitting part may be minimized both when the light emitting part is disposed at the corner portion of the light guide plate and when the light emitting part is disposed at the side surface of the light guide plate. Thus, an area of a bezel of a display apparatus may be reduced and minimized.

In addition, the light source part may merely emit the blue light, and the light emitting part may include the light converting material to convert the blue light to the white light, so that the light efficiency may be enhanced and a coupling between the light emitting part and the light transmitting part may be enhanced.

Alternatively, even where the light source part emits the red, green and blue lights, the light emitting part may mix the red, green and blue lights to make the white light and emits the white light, so that the light transmitting part merely transmits one color light. Thus the coupling between the light emitting part and the light transmitting part may be more enhanced.

BRIEF DESCRIPTION OF THE DRAWINGS

The above and other features and advantages of the invention will become more apparent by describing in detailed exemplary embodiments thereof with reference to the accompanying drawings, in which.

DETAILED DESCRIPTION

Figure 1:
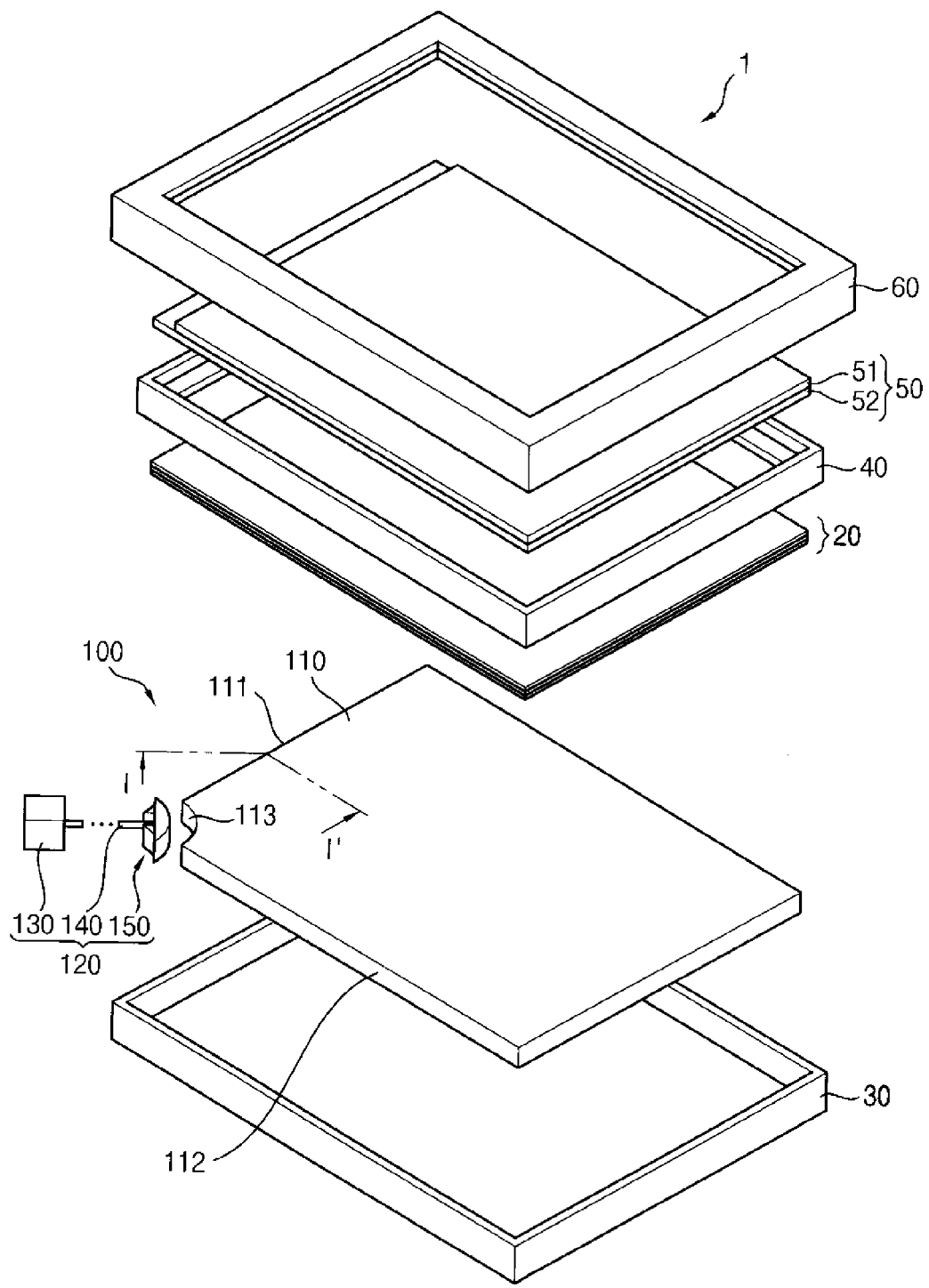
FIG. 1 is an exploded perspective view illustrating an exemplary embodiment of a display apparatus according to the invention.

It will be understood that when an element or layer is referred to as being "on," "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, connected may refer to elements being physically and/or electrically connected to each other. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, steps, operations, elements, and/or components, but do not preclude the presence or addition of one or more features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the invention will be described in further detail with reference to the accompanying drawings.

Figure 2:
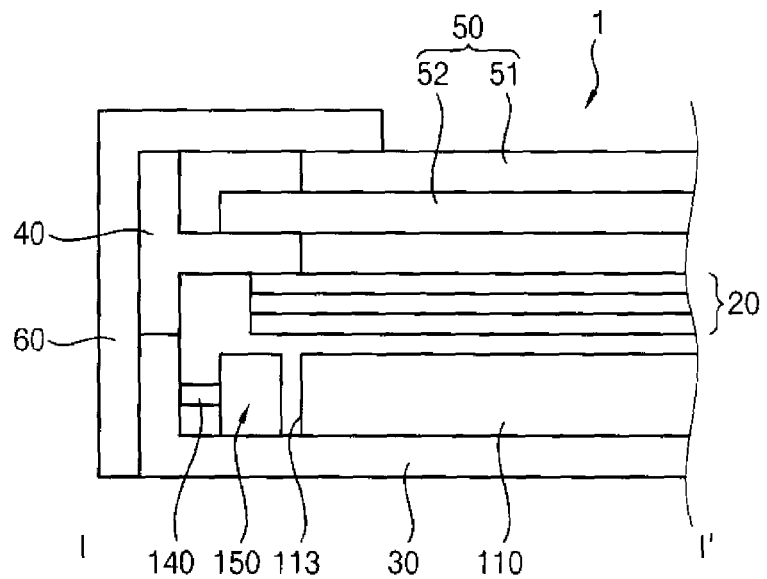
FIG. 2 is a cross-sectional view taken along line I-I' in FIG. 1.

FIG. 1 is an exploded perspective view illustrating an exemplary embodiment of a display apparatus according to the invention. FIG. 2 is a cross-sectional view taken along line I-I' in FIG. 1.

The exemplary embodiment of display apparatus 1 includes a light source assembly 100, optical sheets 20, a receiving container 30, a mold frame 40, a display panel 50 and a cover frame 60.

The light source assembly 100 generates and emits a light, and provides the light to the display panel 50. The optical sheets 20 are disposed over the light source assembly 100 and enhance quality of the light provided to the display panel 50. The receiving container 30 includes a bottom plate and sidewalls to form a receiving space, and the light source assembly 10 and the optical sheets 20 are received in the receiving space. The mold frame 40 is disposed over the optical sheets 20, and is combined with the sidewalls of the receiving container 30 to fix the display panel 50.

The display panel 50 displays an image using the light provided from the light source assembly 100. The display panel 50 may include first and second substrates 51 and 52 facing each other, and a liquid crystal layer (not shown) disposed between the first and second substrates 51 and 52. The cover frame 60 is disposed over the display panel 50, and fixes an edge of the display panel 50. The cover frame 60 is combined with the mold frame 40 and the receiving container 30 to form an outer shape of the display apparatus 1.

The display apparatus 1 of the exemplary embodiment may not be limited as illustrated in FIG. 1, and may be variously changed.

The light source assembly 100 includes a light guide plate 110 and a light source module 120. The light guide plate 110 guides the light from the light source module 120, and provides the light to the display panel 50 disposed over the light source assembly 100.

The light guide plate 110, for example, may have a rectangular plate shape with a predetermined thickness, and includes first and second side surfaces 111 and 112 extending in directions which cross each other. A corner portion of the light guide plate 110 may be defined where virtual extension lines of the first and second side surfaces 111 and 112 meet each other. The light guide plate 110 may include a plurality of corner portions defined by virtual extension lines of side surfaces thereof. The shape of the light guide plate 110 may not be limited as illustrated in FIG. 1, and may be variously changed.

The light guide plate 110 may further include an incident surface 113 at the corner portion defined by the first and second side surfaces 111 and 112. The incident surface 113 connects the first and second side surfaces 111 and 112 with each other, and the light from the light source module 120 is incident into the incident surface 113.

The corner portion of the light guide plate 110 is concaved with a curved shape having a predetermined curvature, to be the incident surface 113 of the light guide plate 110. In the exemplary embodiment, as illustrated in the figures, the incident surface 113 is at the corner portion defined by the first and second side surfaces 111 and 112 of the light guide plate 110. While the incident surface 113 may be at one of the corner portions of the light guide plate 110, alternatively, a plurality of incident surfaces may be respectively at one or more of the corner portions of the light guide plate 110.

The light source module 120 includes a light source part 130, a light transmitting part 140 and a light emitting part 150, and generates and provides the light to the light guide plate 110.

The light source part 130 generates and emits a light, and the light emitted from the light source part 130 is transmitted to the light emitting part 150 through the light transmitting part 140. Here, the light transmitting part 140 may be an optical fiber cable, but is not limited thereto or thereby. The light transmitted to the light emitting part 150 is converted into or mixed into a white light W, and is incident into the incident surface 113 of the light guide plate 110.

The light source part 130 is spaced apart from the light emitting part 150 by a predetermined distance. The transmitting part 140 connects the light source part 130 with the light emitting part 150. Thus, the heat generated from the light source part 130 is not transmitted to the light guide plate 110 or is not transmitted to the display panel 50, and thus an additional heat dissipating structure is unnecessary in the light emitting part 150. Thus, a decrease in display quality or durability of the display apparatus 1 due to heat generated from the light source module 120 is reduced or effectively prevented. Since the heat generated from the light source part 130 is not transmitted to the light guide plate 110, for example, a hot spot and/or bending of a light guide plate may be reduce or effectively prevented.

The light emitting part 150 (refer to FIG. 3), has a half-cylindrical shape, and a light emitting surface thereof having a curved shape faces the incident surface 113 of the light guide plate 110. As mentioned above, the incident surface 113 of the light guide plate 110 is concaved with the curved shape, and thus the light emitting part 150 of the light source module 120 is disposed at the concave portion of the incident surface 113. Here, the curved shape of the incident surface 113 corresponds to the protruded (e.g., convex) curved shape of the light emitting surface of the light emitting part 150.

The display apparatus 1 may include a display area in which an image is displayed, and a non-display area in which an image is not displayed. A bezel of the display apparatus 1 may include a planar distance between the display area and an outer edge of the display apparatus 1, but is not limited thereto or thereby. Referring to FIG. 1 and FIG. 2, for example, a planar distance between an outer edge of the light guide plate 110, and the receiving container 30 and/or mold frame 40, may correspond to a portion of the bezel of the display apparatus 1.

Since a portion of the light emitting part 150 is within the concaved area of the light incident surface 113, a distance between the light guide plate 110 and the receiving container 30 and/or mold frame 40 is not increased by a total length of the light emitting module 120. Accordingly, a planar area occupied by the light emitting part 150 is minimized and thus a size of a bezel of the display apparatus 1 may be reduced and minimized. In addition, since the incident surface 113 of the light guide plate 110 is concaved with the curved shape and the light emitting surface of the light source module 120 is protruded with the curved shape, the light emitted from the light emitting part 150 may have a relatively larger light-advancing angle such that the light may be transmitted to an area of the light guide plate 110 more uniformly.

Figure 3:
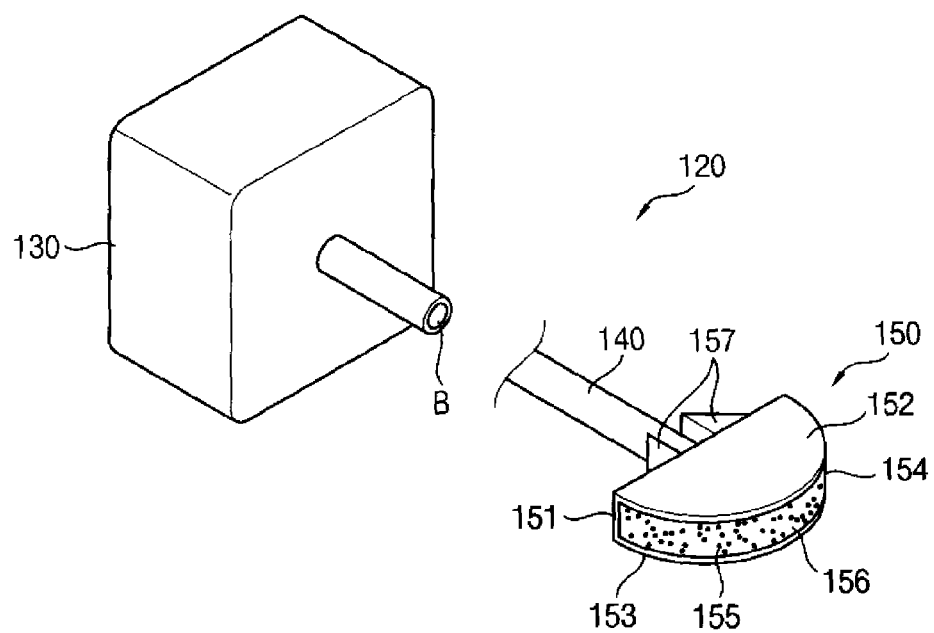
FIG. 3 is a perspective view illustrating an exemplary embodiment of a light source module in FIG. 1.

FIG. 3 is a perspective view illustrating an exemplary embodiment of a light source module in FIG. 1.

Referring to FIG. 3, the exemplary embodiment of the light source module 120 is explained.

The light source part 130 generates and emits the light. In the illustrated exemplary embodiment, the light source part 130 emits the blue light B, but is not limited thereto or thereby. An emitting efficiency of the blue light B is very high. In addition, a coupling between the light transmitting part 140 and the light source part 130 is more effective in transmitting one color having a single wavelength.

The blue light B emitted from the light source part 130 is transmitted to the light emitting part 150 through the light transmitting part 140. The light transmitting part 140 may be the optical fiber cable, and connects the light source part 130 with the light emitting part 150, to transmit the light.

The light emitting part 150 includes upper and lower reflective surfaces 152 and 153, and a rear reflective surface 151. The upper and lower reflective surfaces 152 and 153 face each other. The rear reflective surface 151 connects the upper and lower reflective surfaces 152 and 153 with each other, and is connected to the light transmitting part 140. The light emitting part 150 includes a light emitting surface 154 which faces the rear reflective surface 151 and has a curved shape. The light emitting part 150 emits the light from the light transmitting part 140.

In the illustrated exemplary embodiment, for example, each of the upper and lower reflective surfaces 152 and 153 has a half-circular plate shape, and face each other with a predetermined distance therebetween. The rear reflective surface 151 connects linear-shaped sides of the upper and lower reflective surfaces 152 and 153 with each other, and thus has a relatively flat and uniform thickness plate shape. The light transmitting part 140 is connected to a central portion of the rear reflective surface 151, but is not limited thereto or thereby. A fixing part 157 is at the central portion of the rear reflective surface 151 to fix the light transmitting part 140 to the light emitting part 150.

The light emitting surface 154 connects curved shape sides of the upper and lower reflective surfaces 152 and 153 with each other, and thus has a curved shape. Both of opposing end portions of the light emitting surface 154 are respectively connected to both of opposing end portions of the rear reflective surface 151. Thus, the light emitting surface 154 has a shape substantially the same as a curved shape of a half-cylinder.

The upper and lower reflective surfaces 152 and 153, and the rear reflective surface 151 reflects incident light. Thus, the light incident into the light emitting part 150 through the light transmitting part 140, is reflected by the upper and lower reflective surfaces 152 and 153 and the rear reflective surface 151, and thus is emitted through the light emitting surface 154. Here, the light passing through the light emitting surface 154 may have a light-advancing angle of about 180° due to the curved shape of the light emitting surface 154.

Accordingly, due to the structural shape of the light emitting part 150, the light passing through the light emitting part 150 may have a relatively larger light-advancing angle, and thus a light exiting from the light emitting part may be distributed to a much wider area.

Alternatively, although not shown in figures, the light emitting surface 154 of the light emitting part 150 may have various shapes to enhance the light-advancing angle and to increase a distribution of the exiting light. In an alternative exemplary embodiment, for example, the light emitting surface 154 may have a shape substantially same as each of side surfaces of a triangular column, a rectangular column and so on. In another alternative exemplary embodiment, for example, the upper and lower reflective surfaces 152 and 153 and the light emitting surface 154 of the light emitting part 150 may have a half-triangular column, a half-rectangular column and so on.

The upper and lower reflective surfaces 152 and 153 together with the rear reflective surface 151 and the light emitting surface 154 may define a receiving space of the light emitting part 150. A light converting material 155 and an enclosing material 156 fill the receiving space which is defined by the upper and lower reflective surfaces 152 and 153, the rear reflective surface 151 and the light emitting surface 154.

The light incident into the receiving space of the light emitting part 150 is the blue light B, so that the light emitting part 150 should convert the blue light B to the white light W, to provide the white light W to the light guide plate 110. Thus, the light converting material 155 is included within the light emitting part 150 and the blue light B incident into the receiving space of the light emitting part 150 is converted into the white light W by the light converting material 155. The light converting material 155 is uniformly distributed with small particles in the receiving space, to convert the blue light B to the white light W. In one exemplary embodiment, for example, the light converting material 155 may be a phosphor or a quantum dot.

The enclosing material 156 fixes the light converting material 155 distributed in the receiving space of the light emitting part 150 to enhance light converting efficiency, and encloses the receiving space to protect the light converting material 155. The enclosing material 156, for example, may include a silicone, but is not limited thereto or thereby.

The light emitting surface 154 may be a separate member as an outer surface of the light emitting part 150 and on the enclosing material 156, such as a mold-type member. Alternatively, the mold-type emitting surface is omitted and the enclosing material 156 may form the outer surface directly.

Figure 4:
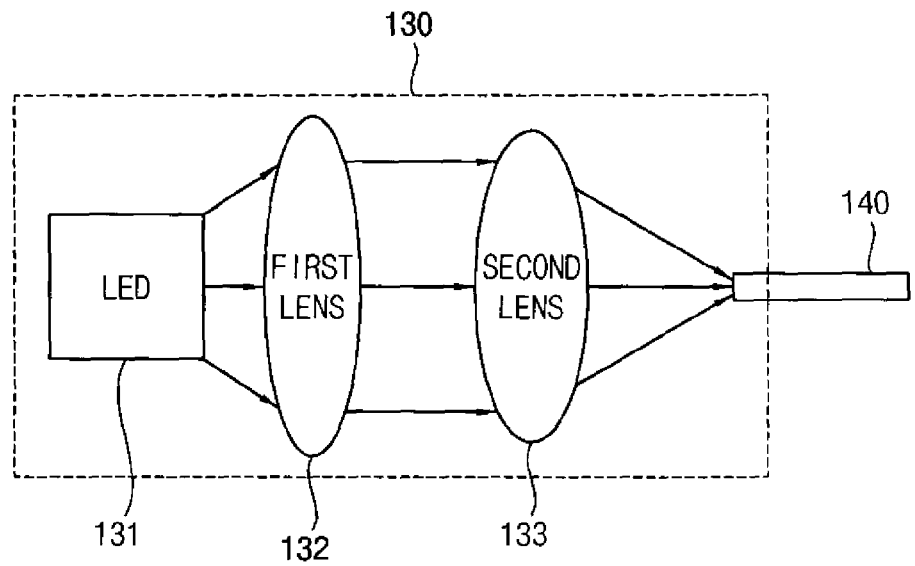
FIG. 4 is a block diagram illustrating an exemplary embodiment of a process of emitting a light in the light source module in FIG. 3.

FIG. 4 is a block diagram illustrating an exemplary embodiment of a process of emitting a light in the light source module in FIG. 3.

Referring to FIG. 4, the light source part 130 includes a light source 131 generating and emitting the light, and first and second lenses 132 and 133 refracting the light.

The light source 131 may be a light emitting diode ("LED"), and in the illustrated exemplary embodiment, the light source 131 may be the LED emitting the blue light B, but is not limited thereto or thereby.

The light emitted from the light source 131 is refracted by the first lens 132 to advance in parallel, and then is refracted by the second lens 133 to be focused on the light transmitting part 140.

Figure 5:
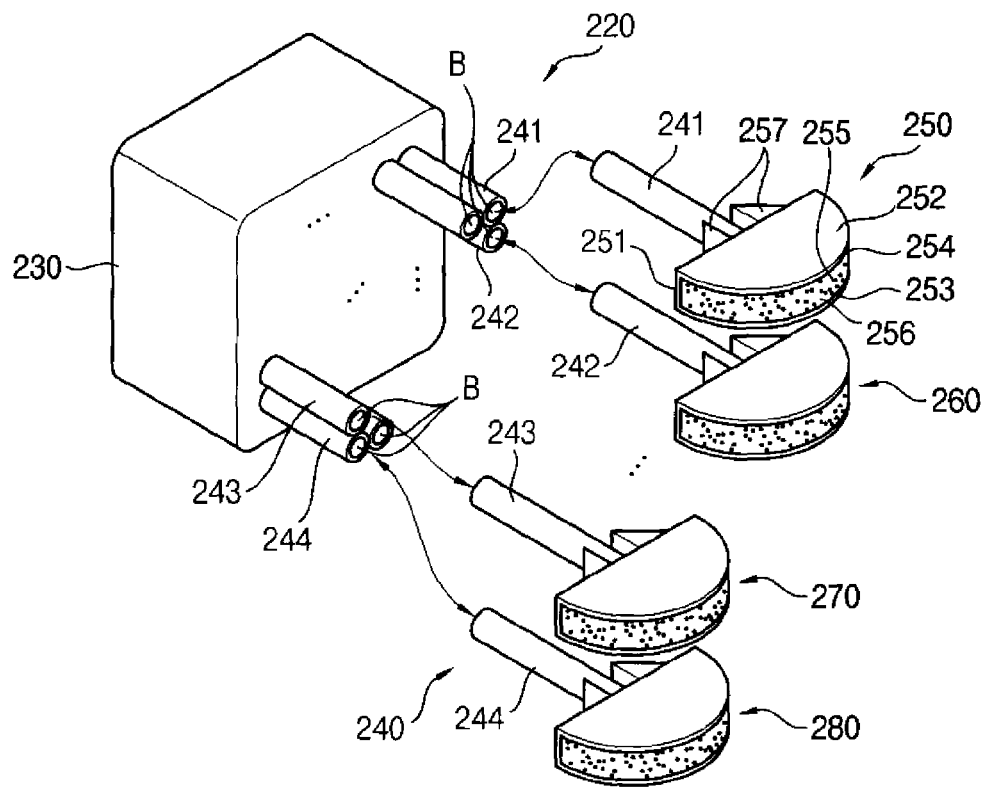
FIG. 5 is a perspective view illustrating another exemplary embodiment of a light source module according to the invention.

FIG. 5 is a perspective view illustrating another exemplary embodiment of a light source module according to the invention.

Referring to FIG. 5, the exemplary embodiment of the light source module 220 includes a light source part 230, a light transmitting part unit 240 and a light emitting part unit. In the illustrated exemplary embodiment, each of the structures of the light transmitting part unit 240 and the light emitting part unit, the light transmitting, the light converting and the light exiting of the light source module 220 are substantially same as those of the light source module 120 according to the previous exemplary embodiment in FIG. 3, except that the light emitted from the light source part 230 is transmitted to each of a plurality of light emitting parts 250, 260, 270 and 280 through each of a plurality of light transmitting parts 241, 242, 243 and 244, respectively. Thus, same reference numerals are used for same elements and any repetitive explanation will be omitted.

The light source part 230 transmits the blue light B generated and emitted from the light source part 230 to the light transmitting parts 241, 242, 243 and 244. Here, although not shown in figure, the light source part 230 includes a plurality of light sources, and the blue light B emitted from each light source is transmitted to each of the light transmitting parts 241, 242, 243 and 244 through the first and second lenses.

The light transmitting parts 241, 242, 243 and 244 are respectively connected to the light emitting parts 250, 260, 270 and 280, and thus the blue light B emitted from the light source part 230 is transmitted to the light emitting part unit. In the light source module 220, a number of the light transmitting parts may be the same as a number of the light emitting parts, such as in one-to-one correspondence, but the invention is not limited thereto or thereby. Each of the light emitting parts 250, 260, 270 and 280, as explained referring to FIG. 3, includes upper and lower reflective surfaces 252 and 253, a rear reflective surface 251 and a light emitting surface 254, and is filled with a light converting material 255 and an enclosing material 256. A fixing part 257 fixes respective light transmitting parts 241, 242, 243 and 244 to the light emitting parts 250, 260, 270 and 280.

Accordingly, one light source part 230 spaced apart from the light emitting parts 250, 260, 270 and 280 provides the light to the light emitting parts 250, 260, 270 and 280. Thus, the light emitting parts 250, 260, 270 and 280 may be disposed at various positions and an amount of the light incident into the light guide plate 110 may be increased.

Figure 6:
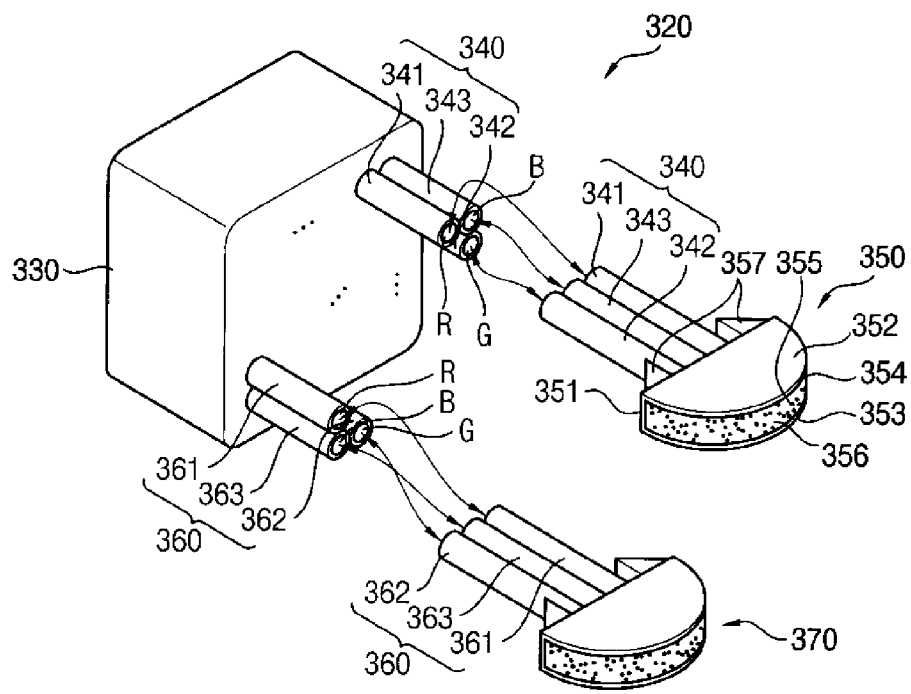
FIG. 6 is a perspective view illustrating still another exemplary embodiment of a light source module according to the invention.

FIG. 6 is a perspective view illustrating still another exemplary embodiment of a light source module according to the invention.

The exemplary embodiment of the light source module 320 includes a light source part 330, light transmitting parts 340 and 360, and light emitting parts 350 and 370. In the illustrated exemplary embodiment, each of the structures of the light transmitting parts and the light emitting parts of the light source module 320 is substantially same as that of the light source module 120 according to the previous exemplary embodiment in FIG. 3, and thus same reference numerals are used for same elements and any repetitive explanation will be omitted.

Referring to FIG. 6, the light source part 330 generates a red light R, a green light G and a blue light B, and each of the red, green and blue lights R, G and B is transmitted to the light emitting parts 350 and 370 through the light transmitting parts 340 and 360.

In one exemplary embodiment, for example, the red light R is transmitted to the light emitting part 350 through a red light transmitting part 341 of the light transmitting part 340. The green light G is transmitted to the light emitting part 350 through a green light transmitting part 342 of the light transmitting part 340. The blue light B is transmitted to the light emitting part 350 through a blue light transmitting part 343 of the light transmitting part 340.

In the illustrated exemplary embodiment, the plurality of the light transmitting parts may be connected to a single one of the light source part 330, and the plurality of the light emitting parts may be connected to the single one of the light source part 330. Thus, the red light R may be transmitted to the light emitting part 370 through a red light transmitting part 361 of the light transmitting part 360. The green light G may be transmitted to the light emitting part 370 through a green light transmitting part 362 of the light transmitting part 360. The blue light B may be transmitted to the light emitting part 370 through a blue light transmitting part 363 of the light transmitting part 360.

Accordingly, one light transmitting part 340 transmits the red, green and blue lights R, G and B to one light emitting part 350 at the same time, one light transmitting part 360 transmits the red, green and blue lights R, G and B to one light emitting part 370 at the same time, and the light source module 320 includes the plurality of light emitting parts and the plurality of light transmitting parts respectively connected with each other. Thus, only one separate light source part 330 provides the light to the light emitting parts 350 and 370, the light emitting parts 350 and 370 may be disposed at various positions and the amount of the light incident into the light guide plate 110 may be increased.

Alternatively, although not shown in the figures, the light source module 320 includes one light transmitting part and one light emitting part connected to each other, and the red, green and blue lights R, G and B are provided to one light emitting part through one light transmitting part at the same time. Here, since there is only one light transmitting and transferring part, the light emitting part should be disposed at an optimal position, to optimize the amount of the light incident into the light guide plate 110.

Hereinafter, the light emitting parts 350 and 370 are explained. In the illustrated exemplary embodiment, the light emitting parts 350 and 370 are substantially same with each other, and thus the light emitting part 350 is explained in detail.

The light emitting part 350 includes upper and lower reflective surfaces 352 and 353, a rear reflective surface 351 and a light emitting surface 354. A fixing part 357 fixes respective light transmitting parts to the light emitting parts. A shape and a structure of the light emitting part 350 are substantially same as those of the light emitting part 150 in FIG. 3.

However, in the illustrated exemplary embodiment, the red, green and blue lights R, G and B are transmitted to the light emitting part 350 at the same time, and thus the light emitting part 350 does not include light converting material to convert the light to the white light W compared to the light emitting part 150 in FIG. 3. The red, green and blue lights R, G and B incident into the light emitting part 350 are mixed in the light emitting part 350 and then exit as the white light W. Thus, the light emitting part 350 is not filled with the light converting material to convert the light to the white light W. However, a light dispersing material 355 dispersing the light in the light emitting part 350, and an enclosing material 356 fixing and enclosing the light dispersing material 355 may fill a receiving space of the light emitting part 350. Thus, the light exiting from the light emitting part 350 has a further increased light-advancing angle.

In the illustrated exemplary embodiment, although not shown in the figures, the light source part 330 may include a plurality of light sources respectively emitting the red, green and blue lights R, G and B, and the red, green and blue lights R, G and B are respectively transmitted by the red light transmitting parts 341 and 361, the green light transmitting parts 342 and 362, and the blue light transmitting parts 343 and 363, through the first and second lenses.

Alternatively, the light source part 330 includes a light source only generating and emitting the blue light B, and further includes a light converting material converting the blue light B to the red and green lights R and G therein. Thus, the blue light B emitted from the light source is partially converted into the red and green lights R and G, and then the light source part 330 may emit the red, green and blue lights R, G and B.

Figure 7:
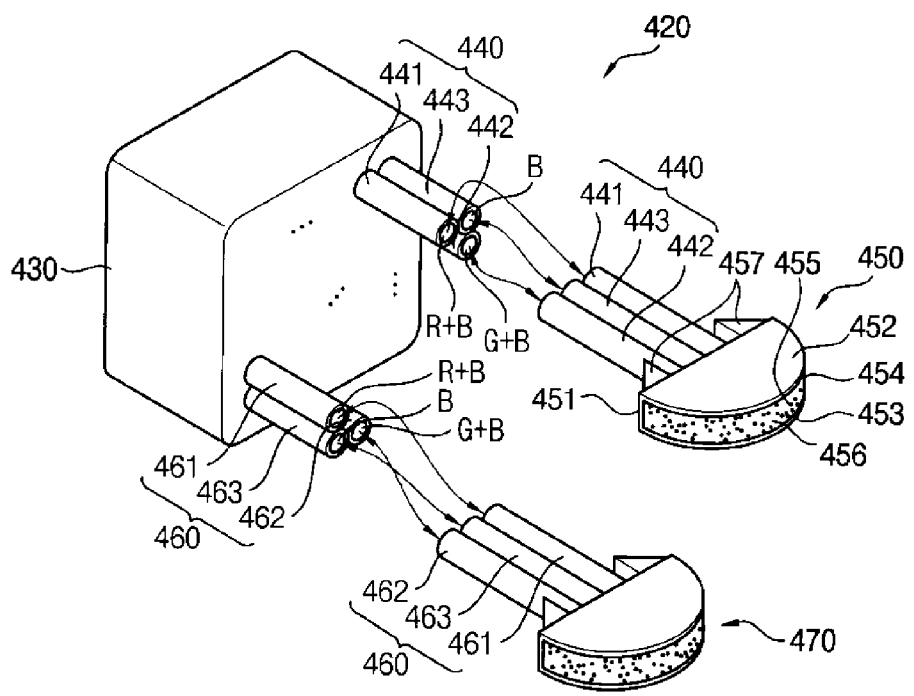
FIG. 7 is a perspective view illustrating yet another exemplary embodiment of a light source module according to the invention.

FIG. 7 is a perspective view illustrating yet another exemplary embodiment of a light source module according to the invention.

The exemplary embodiment light source module 420 includes a light source part 430, light transmitting parts 440 and 460, and light emitting parts 450 and 470. In the illustrated exemplary embodiment, each of the structures of the light transmitting parts and the light emitting parts of the light source module 420 is substantially same as that of the light source module 120 according to the previous exemplary embodiment in FIG. 3, and thus same reference numerals are used for same elements and any repetitive explanation will be omitted.

Referring to FIG. 7, the light source part 430 generates a first light R+B having the red and blue lights mixed with each other, a second light G+B having the green and blue lights mixed with each other. The first light R+B, the second light G+B and the blue light B generated from the light source part 430 are provided to the light emitting parts 450 and 470 through the light transmitting parts 440 and 460.

In one exemplary embodiment, for example, the first light R+B is transmitted to the light emitting part 450 through a first light transmitting part 441 of the light transmitting part 440. The second light G+B is transmitted to the light emitting part 450 through a second light transmitting part 442 of the light transmitting part 440. The blue light B is transmitted to the light emitting part 450 through a blue light transmitting part 443 of the light transmitting part 440.

In the illustrated exemplary embodiment, a plurality of the light transmitting parts may be connected to a single one of the light source part 430, and a plurality of the light emitting parts may be connected to the single one of the light source part 430. Thus, the first light R+B may be transmitted to the light emitting part 470 through a first light transmitting part 461 of the light transmitting part 460. The second light G+B may be transmitted to the light emitting part 470 through a second light transmitting part 462 of the light transmitting part 460. The blue light B may be transmitted to the light emitting part 470 through a blue light transmitting part 463 of the light transmitting part 460.

Accordingly, one light transmitting part 440 transmits the first light R+B, the second light G+B and the blue light B to one light emitting part 450 at the same time, one light transmitting part 460 transmits the first light R+B, the second light G+B and the blue light B to one light emitting part 470 at the same time, and the light source module 420 includes the plurality of light transmitting parts and the plurality light emitting parts respectively connected with each other. Thus, only one separate light source part 430 provides the light to light emitting parts 450 and 470, the light emitting parts 450 and 470 may be disposed at various positions, and an amount of the light incident into the light guide plate 110 may be increased.

Alternatively, although not shown in the figures, the light source module 420 includes one light transmitting part and one light emitting part connected with each other, and thus provides the first light R+B, the second light G+B and the blue light B to one light emitting part through the one light transmitting part at the same time. Here, since there is only one light transmitting and transferring part, the light emitting part should be optimally disposed and thus the amount of the light incident into the light guide plate 110 may be optimized.

Hereinafter, the light emitting parts 450 and 470 are explained. In the illustrated exemplary embodiment, the light emitting parts 450 and 470 are substantially same with each other, and thus the light emitting part 450 is explained in detail.

The light emitting part 450 includes upper and lower reflective surfaces 452 and 453, a rear reflective surface 451 and a light emitting surface 454. A fixing part 457 fixes respective light transmitting parts to the light emitting parts. A shape and the structure of the light emitting part 450 are substantially same as those of the light emitting part 150 in FIG. 3.

In the illustrated exemplary embodiment, the first light R+B, the second light G+B and the blue light B are transmitted to the light emitting part 450 at the same time, such that the red, green and blue lights R, G and B are mixed with each other when they are provided to the light emitting part 450. Thus, it is not necessary to convert the light incident to the light emitting part 450 to the white light W, which is substantially same as explained above referring to FIG. 6.

Thus, the light emitting part 450 does not include light converting material to convert incident light to the white light W. However, the light emitting part 450 does include a light dispersing material 455 dispersing the light in the light emitting part 450, and an enclosing material 456 fixing and enclosing the light dispersing material 455 filled therein. Thus, the light exiting from the light emitting part 450 has a further increased light-advancing angle.

In the illustrated exemplary embodiment, although not shown in the figure, the light source part 430 may include a light source emitting the blue light B, and includes a light converting material converting the blue light B to the red and green light R and G. Thus, the blue light B emitted from the light source is partially converted to the red and green lights R and G, and then the light source part 430 may generate the first light R+B having the red and blue lights R and B, and the second light G+B having the green and blue lights G+B, and the blue light B.

Figure 8:
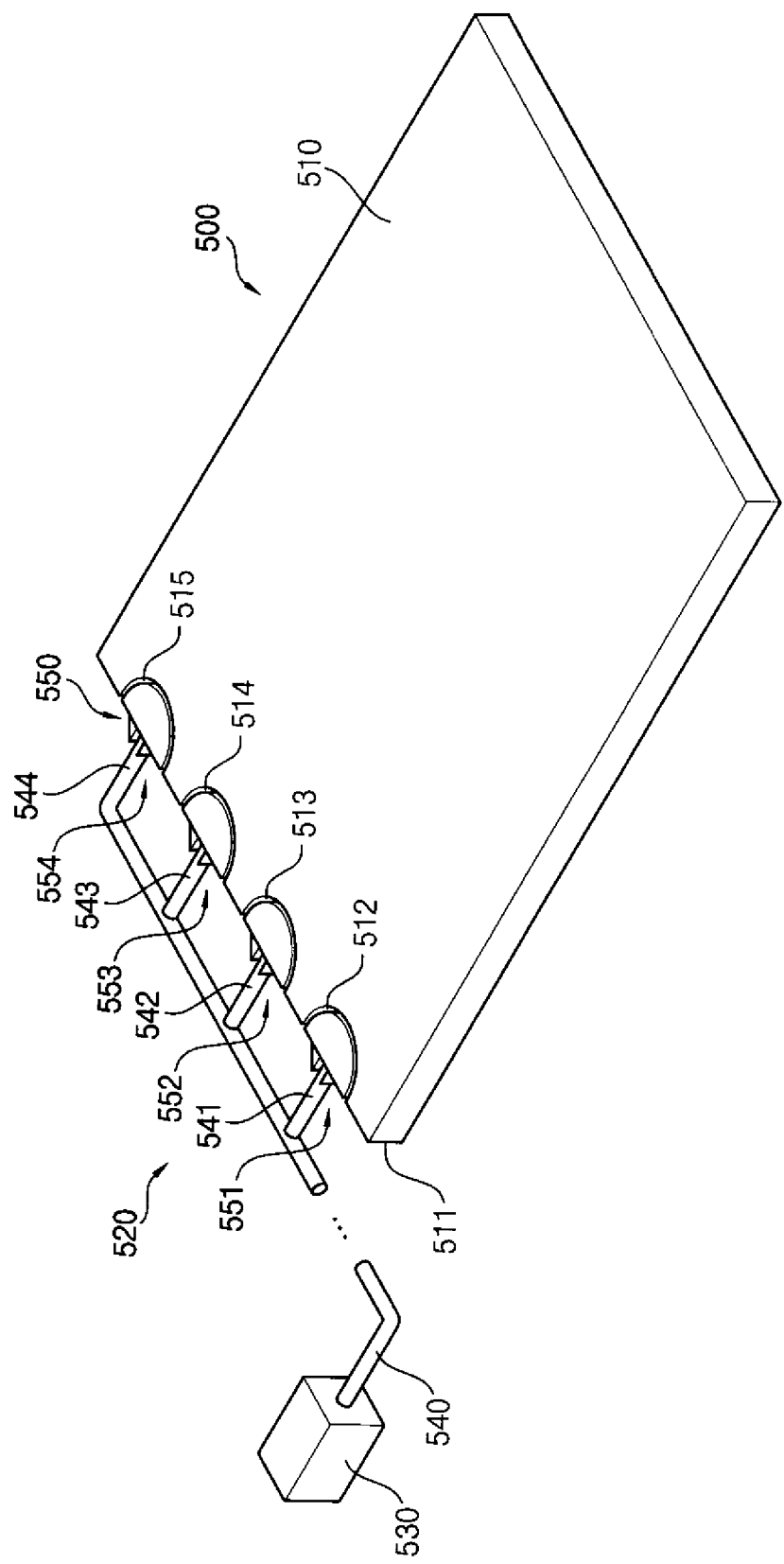
FIG. 8 is a perspective view illustrating another exemplary embodiment of a light source assembly according to the invention.

FIG. 8 is a perspective view illustrating another exemplary embodiment of a light source assembly according to the invention.

Referring to FIG. 8, the light source assembly 500 includes a light guide plate 510 and a light source module 520. In the illustrated exemplary embodiment, the light source module 520 includes a light source part 530, a light transmitting part 540 and a light emitting part unit 550. Each of the structures of the light source part 530, the light transmitting part 540 and the light emitting part unit 550 of the light source module 520 is substantially same as that of the light source module 120 in FIG. 3. Thus, same reference numerals are used for same elements and any repetitive explanation will be omitted.

The light guide plate 510 includes a first side surface 511, and a plurality of incident surfaces 512, 513, 514 and 515 at the first side surface 511. Each of the incident surfaces 512, 513, 514 and 515 is concaved with the curved shape having a predetermined curvature.

The light emitting part unit 550 includes a plurality of light emitting parts 551, 552, 553 and 554 respectively disposed at the incident surfaces 512, 513, 514 and 515. Here, as explained above, each of the light emitting parts 551, 552, 553 and 554 has a protruded (e.g., convex) curved shape, and thus the light emitting parts 551, 552, 553 and 554 are disposed in the concaved portions of the first side surface 511 to correspond to the incident surfaces 512, 513, 514 and 515, respectively. Alternatively, although not shown in the figure, each of the light emitting parts may have a rectangular shape and so on, and thus the concaved portions of the first side surface 511 may be concaved to correspond to the incident surfaces of the light emitting parts.

Since a portion of the light emitting part unit 550 is within the concaved area of the light incident surfaces 512, 513, 514 and 515, a distance between the light guide plate 510 and a receiving container and/or a mold frame is not increased by the light emitting module 520. Thus, a planar area occupied by the light emitting part unit 550 is minimized and thus a size of a bezel of a display apparatus may be reduced and minimized. In addition, since the incident surfaces 512, 513, 514 and 515 are concaved with the curved shape and the light emitting surfaces of the light emitting parts 551, 552, 553 and 554 is protruded with the curved shape, the light emitted from the light emitting part unit 550 has a relatively larger light-advancing angle. Thus, the light may be uniformly distributed to an area of the light guide plate 510.

The light source part 530 of the light source module 520 is spaced apart from the light emitting part unit 550, and the light from the light source part 530 is transmitted to the light emitting part unit 550 through the light transmitting part 540. In one exemplary embodiment, for example, a first end portion of the light transmitting part 540 is connected to the light source part 530 and receives the light, and a second end portion of the light transmitting part 540 includes a plurality of end portions 541, 542, 543 and 544 to transmit the light to the plurality of light emitting parts 551, 552, 553 and 554, respectively.

Alternatively, although not shown in the figures, in the illustrated exemplary embodiment, the light source module 520 may be replaced by any one or more of the light source modules 220, 320 and 420 in FIGS. 5, 6 and 7. Here, each of the light emitting parts 551, 552, 553 and 554 and the light source part 530 may be connected with each other through an independent light transmitting part, and the light may be transmitted to the light emitting parts 551, 552, 553 and 554.

According to one or more of the exemplary embodiments of the invention, a light source part generating and emitting light in a light source module is spaced apart from the light emitting part of the light source module such that heat is not transferred to the light guide plate, and thus an additional heat dissipation structure is unnecessary in the light source assembly. In addition, a decrease in display quality or durability due to heat generated by the light source module is reduced or effectively prevented. Since the heat generated from the light source part of the light source module is not transmitted to the light guide plate, for example, a hot spot or a bending of a light guide plate may be reduced or effectively prevented.

In addition, even though the light emitting part of the light source module may be disposed at the corner portion of the light guide plate, the light emitting surface of the light emitting part and the incident surface of the light guide plate may both have a complementing curved shape, and thus the light incident into the light guide plate may have a wide light-advancing angle.

In addition, the incident surface of the light guide plate is concaved with the curved shape and the light emitting part is disposed partially in the concaved portion of the incident surface. Thus, whether the light emitting part is disposed at the corner portion of the light guide plate or at the side surface of the light guide plate, a planar area occupied by the light emitting part may be minimized. Thus, a planar area of a bezel of a display apparatus may be minimized.

In addition, the light source part may merely emit blue light, and the light emitting part may include light converting material to convert the blue light to white light, so that the light efficiency may be enhanced and a coupling between the light emitting part and the light transmitting part may be enhanced.

Alternatively, even where the light source part emits red, green and blue lights, the light emitting part may mix the red, green and blue lights to make white light and emits the white light, so that the light transmitting part merely transmits one color light. Thus the coupling between the light emitting part and the light transmitting part may be further enhanced.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifies to the disclosed exemplary embodiments, as well as other exemplary embodiments, are intended to be included within the scope of the appended claims. The invention is defined by the following claims, with equivalents of the claims to be included therein.

What is claimed is:

1. A light source module comprising:
a light source unit which generates a light;
a light emitting part spaced apart from the light source unit and comprising:
a light emitting surface;
upper and lower reflective surfaces facing each other; and
a rear reflective surface connecting the upper and lower reflective surfaces with each other, and connected to the light transmitting part,
wherein the rear reflective surface is between the light source unit and the light emitting surface of the light emitting part; and
a light transmitting part which transmits the light generated by the light source unit to the light emitting part,
wherein the light emitting part emits the light transmitted by the light transmitting part, through the light emitting surface.

2. The light source module of claim 1, wherein the light emitting surface of the light emitting part has a curved shape, and each of the upper and lower reflective surfaces has a half-circular plate shape.

3. The light source module of claim 1, wherein the light generated by the light source unit is a blue light.

4. The light source module of claim 3, wherein the upper and lower reflective surfaces, the rear reflective surface and the light emitting surface form a receiving space of the light emitting part, and
the light emitting part further comprises:
a light converting material in the receiving space, wherein the light converting material converts the blue light to a white light, and
an enclosing material in the receiving space, wherein the enclosing material encloses the light converting material in the receiving space.

5. The light source module of claim 4, wherein
the light converting material comprises a phosphor or a quantum dot, and
the enclosing material comprises a silicone.

6. The light source module of claim 3, further comprising a plurality of light transmitting parts and a plurality of light emitting parts, and
wherein the plurality of light transmitting parts are respectively connected to the plurality of light emitting parts.

7. The light source module of claim 1, wherein the light generated by the light source unit comprises a red light, a green light and a blue light.

8. The light source module of claim 7, wherein
the upper and lower reflective surfaces, the rear reflective surface and the light emitting surface form a receiving space of the light emitting part,
the light emitting part further comprises:
a light dispersing material in the receiving space, wherein the light dispersing material increase an exit angle of the light emitted from the light emitting surface; and
an enclosing material in the receiving space, wherein the enclosing material fixes and encloses the light dispersing material in the receiving space, and
the red light, the green light and the blue light are mixed in the receiving space, to be a white light.

9. The light source module of claim 8, wherein the light transmitting part transmits the red light, the green light and the blue light to one light emitting part.

10. The light source module of claim 1,
wherein the light generated from the light source unit comprises a first light, a second light and a blue light, wherein
the first light comprises a mix of red light and the blue light, and
the second light comprises a mix of green light and the blue light.

11. The light source module of claim 10, wherein
the upper and lower reflective surfaces, the rear reflective surface and the light emitting surface form a receiving space of the light emitting part,
the light emitting part further comprises:
a light dispersing material in the receiving space, wherein the light dispersing material increase an exit angle of the light emitted from the light emitting surface; and
an enclosing material in the receiving space, wherein the enclosing material fixes and encloses the light dispersing material in the receiving space, and the first light, the second light and the blue light are mixed in the receiving space, to be a white light.

12. The light source module of claim 11, wherein the light transmitting part transmits the first light, the second light and the blue light to one light emitting part.

13. The light source module of claim 1, wherein the light transmitting part is an optical fiber cable.

14. The light source module of claim 1, wherein the light source unit comprises:
a light emitting diode which generates and emits the light;
a first lens which advances the light in parallel; and
a second lens which focuses the light to the light transmitting part.

15. A light source assembly comprising:
a light guide plate which guides a light; and
a light source module which generates and provides the light to the light guide plate, wherein the light source module comprises:
a light source unit which generates the light;
a light emitting part spaced apart from the light source unit and comprising:
a light emitting surface,
upper and lower reflective surfaces facing each other; and
a rear reflective surface connecting the upper and lower reflective surfaces with each other, and connected to the light transmitting part,
wherein the rear reflective surface is between the light source unit and the light emitting ht emitting part; and
a light transmitting part which transmits the light generated by the light source unit to the light emitting part;
wherein the light emitting part emits the light transmitted by the light transmitting part, through the light emitting surface.

16. The light source assembly of claim 15, wherein
the light guide plate comprises first and second side surfaces which cross each other, and
the light source module is at a corner portion of the light guide plate where the first and second side surfaces cross each other.

17. The light source assembly of claim 16, wherein the light emitting surface of the light emitting part has a curved shape, and
the light guide plate comprises an incident surface through which the light from the light emitting surface is incident,
wherein the incident surface of the light guide plate is between the first and second side surfaces, and has a curved shape.

18. The light source assembly of claim 15, wherein the light guide plate comprises a light incident side surface, and
further comprising a plurality of light source modules adjacent to the light incident side surface.

19. The light source assembly of claim 18, wherein the light incident side surface comprises a plurality of incident surfaces each with a concave curved shape, and
the plurality of light source modules are respectively adjacent to the plurality of incident surfaces.

* * * * *